United States Patent
Schoenhaber et al.

(10) Patent No.: US 12,434,231 B2
(45) Date of Patent: Oct. 7, 2025

(54) CATALYTICALLY ACTIVE PARTICULATE FILTER

(71) Applicant: UMICORE AG & CO. KG, Hanau-Wolfgang (DE)

(72) Inventors: Jan Schoenhaber, Darmstadt (DE); Naina Deibel, Pfungstadt (DE); Martin Roesch, Rodgau (DE); Joerg-Michael Richter, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 1044 days.

(21) Appl. No.: 17/599,214

(22) PCT Filed: Mar. 29, 2019

(86) PCT No.: PCT/EP2019/057989
§ 371 (c)(1),
(2) Date: Sep. 28, 2021

(87) PCT Pub. No.: WO2020/200394
PCT Pub. Date: Oct. 8, 2020

(65) Prior Publication Data
US 2022/0176364 A1    Jun. 9, 2022

(51) Int. Cl.
*B01D 53/94*       (2006.01)
*B01J 23/00*       (2006.01)
(Continued)

(52) U.S. Cl.
CPC .............. *B01J 35/19* (2024.01); *B01D 53/945* (2013.01); *B01D 53/9468* (2013.01);
(Continued)

(58) Field of Classification Search
CPC . B01J 35/19; B01J 23/002; B01J 23/10; B01J 23/464; B01J 35/613; B01J 35/615;
(Continued)

(56) References Cited

U.S. PATENT DOCUMENTS 8,066,963 B2 * 11/2011 Klingmann .......... B01D 53/945
                                                   423/247
8,640,440 B2 *  2/2014 Klingmann ............ B01J 23/002
                                                   502/328
(Continued)

FOREIGN PATENT DOCUMENTS

CN          105964253 A      9/2016
CN          107405605 A     11/2017
(Continued)

OTHER PUBLICATIONS

International Search Report dated Dec. 6, 2019 for International Patent Application No. PCT/EP2019/057989 (4 pages in German with English Translation).
(Continued)

*Primary Examiner* — Huy Tram Nguyen
(74) *Attorney, Agent, or Firm* — Smith, Gambrell & Russell, LLP

(57) ABSTRACT

The invention relates to a particulate filter which comprises a wall flow filter of length L and two catalytically active coatings Y and Z, wherein the wall flow filter comprises channels E and A that extend in parallel between a first and a second end of the wall flow filter and are separated by porous walls which form surfaces OE and OA, respectively, and wherein the channels E are closed at the second end and the channels A are closed at the first end, and the coatings Y and Z have the same oxygen storage components and the same carrier materials for noble metals. The invention is characterised in that the coating Y is located in the channels E on the surfaces OE and the coating Z is located in the channels A on the surfaces OA.

16 Claims, 3 Drawing Sheets

(51) Int. Cl.
  *B01J 23/10* (2006.01)
  *B01J 23/46* (2006.01)
  *B01J 35/00* (2006.01)
  *B01J 35/61* (2024.01)
  *F01N 3/035* (2006.01)

(52) U.S. Cl.
  CPC ............ *B01J 23/002* (2013.01); *B01J 23/10* (2013.01); *B01J 23/464* (2013.01); *B01J 35/613* (2024.01); *B01J 35/615* (2024.01); *F01N 3/035* (2013.01); *B01D 2255/1023* (2013.01); *B01D 2255/1025* (2013.01); *B01D 2255/2063* (2013.01); *B01D 2255/2092* (2013.01); *B01D 2255/9022* (2013.01); *B01D 2255/908* (2013.01); *B01D 2255/9155* (2013.01); *B01D 2255/9207* (2013.01)

(58) Field of Classification Search
  CPC .... B01J 23/63; B01D 53/945; B01D 53/9468; B01D 2255/1023; B01D 2255/1025; B01D 2255/2063; B01D 2255/2092; B01D 2255/9022; B01D 2255/908; B01D 2255/9155; B01D 2255/9207; B01D 2255/2061; B01D 2255/407; B01D 2258/014; F01N 3/035; F01N 3/101; F01N 2510/0682; F01N 2570/16
  USPC ......................................................... 422/120
  See application file for complete search history.

(56) References Cited

U.S. PATENT DOCUMENTS

| | | |
|---|---|---|
| 9,238,982 B2 | 1/2016 | Springer et al. |
| 10,933,373 B2 | 3/2021 | Deibel et al. |
| 11,203,958 B2 | 12/2021 | Clowes et al. |
| 11,400,414 B2 | 8/2022 | Deibel et al. |
| 2018/0071679 A1 | 3/2018 | Karpov et al. |
| 2021/0086134 A1 | 3/2021 | Schoenhaber et al. |

FOREIGN PATENT DOCUMENTS

| | | | |
|---|---|---|---|
| CN | 108295851 A * | 7/2018 | ............ B01J 23/002 |
| CN | 108350777 A | 7/2018 | |
| DE | 10 2011 050788 A1 | 12/2012 | |
| EP | 1 657 410 A2 | 5/2006 | |
| EP | 2 042 225 A1 | 4/2009 | |
| EP | 2 042 226 A2 | 4/2009 | |
| EP | 3 162 428 A1 | 5/2017 | |
| EP | 3 205 388 A1 | 8/2017 | |
| EP | 3 207 977 A1 | 8/2017 | |
| EP | 3 207 978 A1 | 8/2017 | |
| EP | 3 207 987 A1 | 8/2017 | |
| EP | 3 207 989 A1 | 8/2017 | |
| EP | 3 207 990 A1 | 8/2017 | |
| EP | 3 501 647 A1 | 6/2019 | |
| JP | 2007-069120 A | 3/2007 | |
| WO | 2016/056573 A1 | 4/2016 | |
| WO | 2018/172299 A1 | 9/2018 | |

OTHER PUBLICATIONS

Written Opinion of the International Searching Authority dated Dec. 6, 2019 for International Patent Application No. PCT/EP2019/057989 (6 pages in German with English Translation).
International Preliminary Report on Patentability dated Sep. 28, 2021 for International Patent Application No. PCT/EP2019/057989 (7 pages in German with English Translation).
Von Johann Siebler, et al. MTZ Motortechnische Zeitschrift [Katalysatorprüfung] 1994, 55, pp. 214-218.
DIN 66132: Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German with English machine translation.
First Chinese Office Action mailed Apr. 20, 2023 for Chinese Patent Application No. 201980091676.7 (6 pages in Chinese; 6 pages in English).
Second Chinese Office Action mailed Nov. 20, 2023 for Chinese Patent Application No. 201980091676.7 (5 pages in Chinese; 7 pages in English).
Von Johann Siebler, et al. MTZ Motortechnische Zeitschrift [Katalysatorprüfung] 1994, 55, pp. 214-218 (*resubmitted with improved translation*).

* cited by examiner

CATALYTICALLY ACTIVE PARTICULATE FILTER

The present invention relates to a catalytically-active particulate filter that is particularly suitable for the removal of particles, carbon monoxide, hydrocarbons, and nitrogen oxides from the exhaust gas of internal combustion engines fueled by a stoichiometric air-fuel mixture.

Exhaust gases from combustion engines, i.e., gasoline engines, fueled by stoichiometric air/fuel mixtures are cleaned in conventional methods with the aid of three-way catalytic converters. Such catalytic converters are capable of simultaneously converting the three major gaseous pollutants of the engine, viz., hydrocarbons, carbon monoxide, and nitrogen oxides, into harmless components.

In addition to such gaseous pollutants, the exhaust gas from gasoline engines also contains extremely fine particles (PM), which arise from the incomplete combustion of the fuel and essentially consist of soot. In contrast to the particle emission of diesel engines, the particles in the exhaust gas of stoichiometrically-operated gasoline engines are very small and have an average particle size of less than 1 µm. Typical particle sizes range from 10 to 200 nm. Furthermore, the amount of particles emitted is very low and ranges from 2 to 4 mg/km. The European exhaust gas emission standard EU-6c is associated with a conversion of the limit value for such particles from the particle mass limit value to a more critical particle number limit value of $6 \times 10^{11}$/km (in the Worldwide Harmonized Light Vehicles Test Cycle—WLTP). This creates a need for exhaust gas cleaning concepts for stoichiometrically operated combustion engines, which include effectively-operating equipment for removing particles.

Wall flow filters made of ceramic materials, such as silicon carbide, aluminum titanate, and cordierite, have proven themselves in the field of cleaning exhaust gases from lean-burning engines, i.e., in particular, diesel engines. These wall flow filters are made up of a large number of parallel channels formed by porous walls. The channels are alternately closed at one of the two ends of the filter so that channels A, which are open at the first side of the filter and closed at the second side of the filter, and channels B, which are closed at the first side of the filter and open at the second side of the filter, are formed. For example, exhaust gas flowing into channels A can leave the filter only via channels B, and for this purpose must flow through the porous walls between channels A and B. When the exhaust gas passes through the wall, the particles are retained, and the exhaust gas is cleaned.

The particles retained in this manner must then be burnt off or oxidized in order to prevent a clogging of the filter or an unacceptable increase in the back pressure of the exhaust gas system. For this purpose, the wall flow filter is, for example, provided with catalytically-active coatings that reduce the ignition temperature of soot.

Applying such coatings to the porous walls between the channels (so-called "on-wall coating") or introducing them into the porous walls (so-called "in-wall coating") is already known. EP 1 657 410 A2 also already describes a combination of both coating types; that is, part of the catalytically-active material is present in the porous walls and another part is present on the porous walls.

The concept of removing particles from the exhaust gas using wall flow filters has already been applied to the cleaning of exhaust gas from combustion engines operated with stoichiometric air/fuel mixtures; see, for example, EP 2042226 A2. According to its teaching, a wall flow filter comprises two layers arranged one above the other, wherein one can be arranged in the porous wall, and the other can be arranged on the porous wall.

DE 102011050788 A1 pursues a similar concept. There, the porous filter walls contain a catalyst material of a three-way catalytic converter, while, in addition, a catalyst material of a three-way catalytic converter is applied to partial regions of the filter walls.

Further documents describing filter substrates provided with catalytically-active coatings are EP 3205388 A1 EP 3207977 A1, EP 3207978 A1, EP 3207987 A1, EP 3207989 A1, EP 3207990 A1, and EP 3162428 A1.

There is still a need for catalytically-active particulate filters that combine the functionalities of a particulate filter and a three-way catalytic converter and at the same time allow for adhering to the limits that will apply in the future.

The present invention relates to a particulate filter, comprising a wall flow filter of length L and two coatings Y and Z, which may preferably be completely identical, wherein the wall flow filter comprises channels E and A that extend in parallel between a first and a second end of the wall flow filter and are separated by porous walls which form surfaces $O_E$ or $O_A$, and wherein the channels E are closed at the second end and the channels A are closed at the first end, and wherein the coatings Y and Z comprise the same oxygen storage components and the same carrier materials for precious metals, and the coating Y is located in the channels E on the surfaces $O_E$ and extends from the first end of the wall flow filter over 55 to 90% of the length L, and the coating Z is located in the channels A on the surfaces $O_A$ and extends from the second end of the wall flow filter over 55 to 90% of the length L, and wherein the coatings Y and Z contain aluminum oxide in a quantity of 20 to 70 wt %, relative to the total weight of the coating Y or Z, rhodium, palladium, or palladium and rhodium and one or more oxygen storage components in a quantity of 30 to 80 wt %, relative to the total weight of the coating Y or Z.

Figure 1:
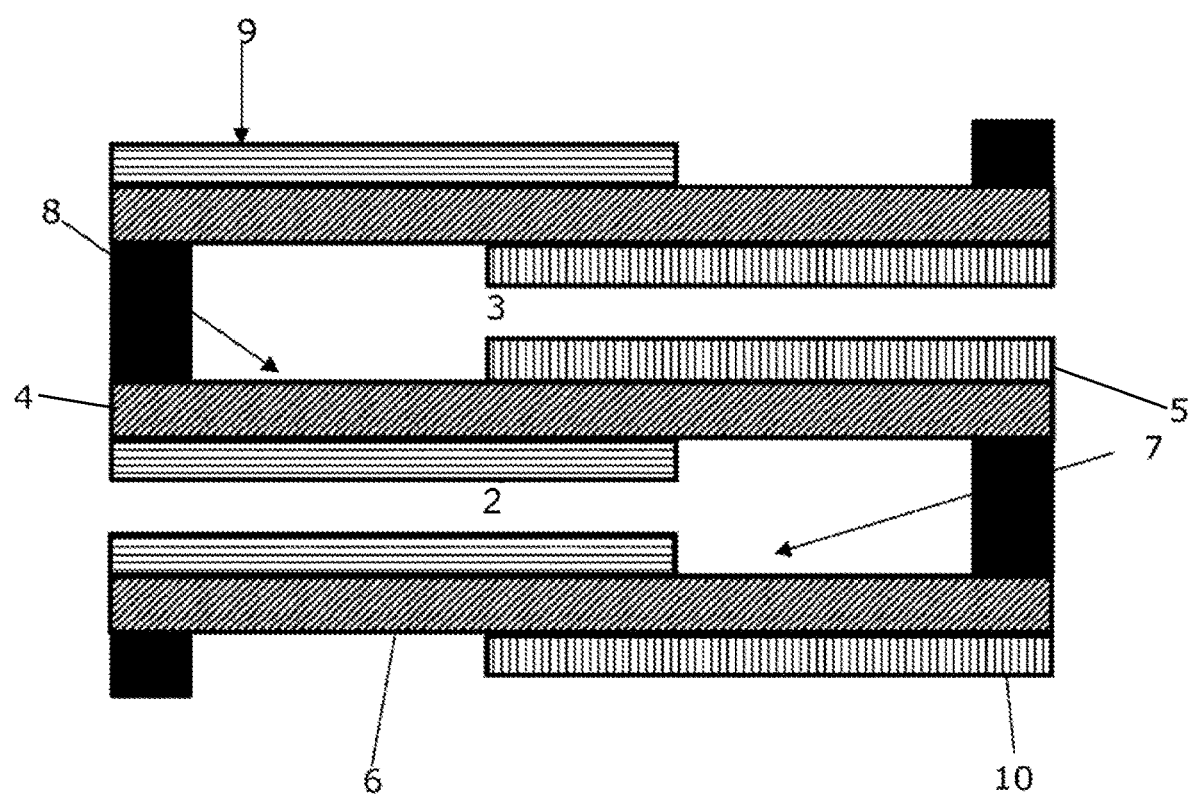
FIG. 1 shows a particulate filter according to the invention.

The coatings Y and Z are three-way catalytically active—especially at operating temperatures of 250 to 1,100° C., They usually contain one or more precious metals affixed to one or more carrier materials, and one or more oxygen storage components. The coatings Y and Z comprise the same oxygen storage components and the same carrier materials for precious metals in different, but preferably equal, quantities. The coatings Y and Z also contain the same or different precious metals in the same or different quantities. The coatings Y and Z are particularly preferably completely the same.

Platinum, palladium, and rhodium are particularly suitable as precious metals, wherein palladium, rhodium, or palladium and rhodium are preferred, and palladium and rhodium are particularly preferred. Based upon the is particulate filter according to the invention, the proportion of rhodium in the entire precious metal content is, in particular, greater than or equal to 10 wt %. The porous walls of the particulate filter according to the invention are preferably free of precious metals. The precious metals are usually used in quantities of 0.15 to 5 g/L, relative to the volume of the wall flow filter.

As carrier materials for the precious metals, all materials familiar to the person skilled in the art for this purpose can be considered. Such materials are, in particular, metal oxides with a BET surface area of 30 to 250 m²/g—preferably, 100 to 200 m²/g (determined according to DIN 66132). Particularly suitable carrier materials for the precious metals are selected from the series consisting of aluminum oxide, doped aluminum oxide, silicon oxide, titanium dioxide, and mixed oxides of one or more of these.

Doped aluminum oxides are, for example, aluminum oxides doped with lanthanum oxide, zirconium oxide, and/or titanium oxide. Lanthanum-stabilized aluminum oxide is, advantageously, used, wherein lanthanum is advantageously used in quantities of 1 to 10 wt %—preferably, 3 to 6 wt %—in each case calculated as $La_2O_3$ and relative to the weight of the stabilized aluminum oxide. Another suitable carrier material is lanthanum-stabilized aluminum oxide, the surface of which is coated with lanthanum oxide, with barium oxide, or with strontium oxide.

Cerium/zirconium/rare earth metal mixed oxides are particularly suitable as the oxygen storage component. The term, "cerium/zirconium/rare earth metal mixed oxide," in the sense of the present invention excludes physical mixtures of cerium oxide, zirconium oxide, and rare earth oxide. Rather, "cerium/zirconium/rare earth metal mixed oxides" are characterized by a largely homogeneous, three-dimensional crystal structure that is ideally free of phases of pure cerium oxide, zirconium oxide, or rare earth oxide. Depending upon the manufacturing process, however, not completely homogeneous products may arise, which can generally be used without any disadvantage. In all other respects, the term, "rare earth metal" or "rare earth metal oxide," within the meaning of the present invention, does not include cerium or cerium oxide.

Lanthanum oxide, yttrium oxide, praseodymium oxide, neodymium oxide, and/or samarium oxide can, for example, be considered as rare earth metal oxides in the cerium/zirconium/rare earth metal mixed oxides, Lanthanum oxide, yttrium oxide, and/or praseodymium oxide are preferred. Lanthanum oxide and/or yttrium oxide are particularly preferred, and lanthanum oxide and yttrium oxide, yttrium oxide and praseodymium oxide, and lanthanum oxide and praseodymium oxide are more particularly preferred. In embodiments of the present invention, the oxygen storage components are particularly preferably free of neodymium oxide.

According to the invention, the cerium oxide to zirconium oxide mass ratio in the cerium/zirconium/rare earth metal mixed oxides can vary within wide limits. It is, for example, 0.1 to 1.5—preferably, 0.2 to 1 or 0.3 to 0.5.

If the cerium/zirconium/rare earth metal mixed oxides contain yttrium oxide as a rare earth metal, the proportion thereof in the mixed oxide is, in particular, 2 to 15 wt %, and preferably 3 to 10 wt %.

If the cerium/zirconium/rare earth metal mixed oxides contain praseodymium oxide as a rare earth metal, the proportion thereof is, in particular, 2 to 15 wt %, and preferably 3 to 10 wt %.

If the cerium/zirconium/rare earth metal mixed oxides contain lanthanum oxide and yttrium oxide as rare earth metal, the mass ratio thereof is, in particular, between 0.1 to 1, and preferably 0.3 to 1.

If the cerium/zirconium/rare earth metal mixed oxides contain lanthanum oxide and praseodymium oxide as a rare earth metal, the mass ratio thereof is, in particular, 0.1 to 1, and preferably 0.3 to 1.

The coatings Y and Z usually contain oxygen storage components in quantities of 15 to 120 g/L, relative to the volume of the wall flow filter.

The mass ratio of carrier materials and oxygen storage components in the coatings Y and Z is usually 0.3 to 1.5, e.g., 0.4 to 1.3.

In embodiments of the present invention, one or both of the coatings Y and Z contain an alkaline earth compound, such as strontium oxide, barium oxide, or barium sulfate. The amount of barium sulfate per coating is, in particular, 2 to 20 g/L volume of the wall flow filter.

In further embodiments of the present invention, one or both of the coatings Y and Z contain additives, such as rare earth compounds, e.g., lanthanum oxide, and/or binders, e.g., aluminum compounds. Such additives are used in quantities that may vary within wide limits and that the person skilled in the art can determine by simple means in the specific case. They may help improve the rheology of the coating.

In embodiments of the present invention, the coatings Y and Z comprise lanthanum-stabilized aluminum oxide, rhodium, palladium, or palladium and rhodium and an oxygen storage component comprising zirconium oxide, cerium oxide, yttrium oxide, and lanthanum oxide.

In other embodiments of the present invention, the coatings Y and Z comprise lanthanum-stabilized aluminum oxide, rhodium, palladium, or palladium and rhodium and an oxygen storage component comprising zirconium oxide, cerium oxide, praseodymium oxide, and lanthanum oxide.

In other embodiments of the present invention, the coatings Y and Z comprise lanthanum-stabilized aluminum oxide, rhodium, palladium, or palladium and rhodium, a first oxygen storage component comprising zirconium oxide, cerium oxide, yttrium oxide, and lanthanum oxide, and a second oxygen storage component comprising zirconium oxide, cerium oxide, yttrium oxide, and praseodymium oxide.

In embodiments, the coatings Y and Z each comprise lanthanum-stabilized aluminum oxide in quantities from 20 to 70 wt %—particularly preferably, 30 to 60 wt %—and the oxygen storage component in quantities from 30 to 80 wt %—particularly preferably, 40 to 70 wt %—in each case relative to the total weight of the coating Y or Z.

In embodiments of the present invention, the coating Y preferably extends from the first end of the wall flow filter over 55 to 90%—particularly preferably over 57 to 80%, but very particularly preferably over 57 to 65%—of the length L of the wall flow filter. The load of the wall flow filter with coating Y preferably amounts to 33 to 125 g/L, relative to the volume of the wall flow filter. In embodiments of the present invention, the coating Z preferably extends from the second end of the wall flow filter over 55 to 90%—in particular, over 57 to 80%, but very particularly preferably over 67 to 65%—of the length L of the wall flow filter. The loading of the wall flow filter with coating Z preferably amounts to 33 to 125 g/L, relative to the volume of the wall flow filter.

A preferred embodiment relates to a wall flow filter having a coating Y with a length of 57 to 80% starting from the first end of the wall flow filter, and a coating Z with a length L of 57 to 80% starting from the second end of the wall flow filter.

In embodiments of the present invention, the sum of the lengths of coating Y and coating Z is 110 to 160% of the length L—preferably, 115 to 140% of the length L.

In embodiments of the present invention, the coatings Y and Z contain no zeolite and no molecular sieve.

The total load of the particulate filter according to the invention with the coatings Y and Z amounts, in particular, to 40 to 150 g/L, relative to the volume of the wall flow filter.

In a more preferred embodiment of the present invention, it relates to a particulate filter which comprises a wall flow filter of length L and two coatings Y and Z, wherein the wall flow filter comprises channels E and A that extend in parallel between a first and a second end of the wall flow filter and are separated by porous walls which form the surfaces $O_E$ or $O_A$, and wherein the channels E are closed at the second end and the channels A are closed at the first end, and wherein the coatings Y and Z comprise the same oxygen storage components and the same carrier materials for precious metals, characterized in that coating Y is located in the channels E on the surfaces $O_E$ and extends from the first end of the wall flow filter over 57 to 80% of the length L, coating Z is located in channels A on the surfaces $O_A$ and extends from the second end of the wall flow filter over 57 to 80% of length L, and the coatings Y and Z contain aluminum oxide in an amount of 20 to 70 wt %, relative to the total weight of the coating Y or Z, rhodium, palladium, or palladium and rhodium and an oxygen storage component in an amount of 30 to 80 wt %, relative to the total weight of the coating Y or Z, wherein the oxygen storage component comprises zirconium oxide, cerium oxide, lanthanum oxide, and yttrium oxide or zirconium oxide, cerium oxide, lanthanum oxide, and praseodymium oxide or a mixture of two oxygen storage components, wherein one oxygen storage component contains zirconium oxide, cerium oxide, lanthanum oxide, and yttrium oxide, and the other contains zirconium oxide, cerium oxide, lanthanum oxide, and praseodymium oxide. Most preferably, both coatings Y and Z are completely the same. The embodiments explained above also apply with respect to this one.

Wall flow filters that can be used in accordance with the present invention are well-known and available on the market. They consist, for example, of silicon carbide, aluminum titanate, or cordierite, and have, for example, a cell density of 200 to 400 cells per inch and usually a wall thickness between 6 and 12 mil, or 0.1524 and 0.305 millimeters. In the uncoated state, they have porosities of 50 to 80—in particular, 55 to 75%—for example. In the uncoated state, their average pore size is, for example, 10 to 25 micrometers. Generally, the pores of the wall flow filter are so-called open pores, i.e., they have a connection to the channels. Furthermore, the pores are normally interconnected with one another. This enables, on the one hand, easy coating of the inner pore surfaces and, on the other, easy passage of the exhaust gas through the porous walls of the wall flow filter.

The particulate filter according to the invention can be produced according to methods known to the person skilled in the art, e.g., by applying a coating suspension, which is usually called a washcoat, to the wall flow filter by means of one of the usual dip-coating methods or pump- and suction-coating methods. Thermal post-treatment or calcination usually follow. The coatings Y and Z are obtained in separate and successive coating steps.

The person skilled in the art knows that the average pore size of the wall flow filter and the average particle size of the catalytically-active materials must be matched to each other in order to achieve an on-wall coating or an in-wall coating. In the case of an in-wall coating, the average particle size of the catalytically-active materials must be small enough to penetrate the pores of the wall flow filter. In contrast, in the case of an on-wall coating, the average particle size of the catalytically-active materials must be large enough not to penetrate the pores of the wall flow filter.

In embodiments of the present invention, the coating suspensions for the production of the coatings Y and Z are ground to a particle size distribution of $d_{50}$=4 to 8 μm and $d_{99}$=22 to 16 μm.

The particulate filter according to the invention is perfectly suitable for removing particles, carbon monoxide, hydrocarbons, and nitrogen oxides from the exhaust gas of combustion engines operated with a stoichiometric air/fuel mixture.

The present invention thus also relates to a method for removing particles, carbon monoxide, hydrocarbons, and nitrogen oxides from the exhaust gas of combustion engines operated with a stoichiometric air/fuel mixture, characterized in that the exhaust gas is passed over a particulate filter according to the invention.

The exhaust gas can be passed over a particulate filter according to the invention in such a way that it enters the particulate filter through channels E and leaves it again through channels A. However, it is also possible for the exhaust gas to enter the particulate filter through channels A and to leave it again through channels E.

Surprisingly, it has been found that it is advantageous to distribute the catalytic coating onto the largest possible surface area of the porous filter wall. According to the experiments, the decisive factor for low exhaust gas back pressure is not the degree of coverage of the filter walls, as originally assumed, but rather the layer thickness of the catalytic coating applied. By distributing the coating over a large area to at least 55% of the filter length per zone, the exhaust gas back pressure can be reduced, and a high catalytic activity can be achieved at the same time. This was not to be expected, based upon the known prior art.

FIG. 1 shows a particulate filter according to the invention which comprises a wall flow filter of length L (1) having channels E (2) and channels A (3) that extend in parallel between a first end (4) and a second end (5) of the wall flow filter and are separated by porous walls (6), which form surfaces $O_E$ (7) or $O_A$ (8), and wherein the channels E (2) are closed at the second end (5) and the channels A (3) are closed at the first end (4). Coating Y (9) is located in the channels E (2) on the surfaces $O_E$ (7), and coating Z (10) is located in the channels A (3) on the surfaces $O_A$ (8).

The invention is explained in more detail in the following examples.

COMPARATIVE EXAMPLE 1

Aluminum oxide stabilized with lanthanum oxide was suspended in water together with a first oxygen storage component, which comprised 40 wt % cerium oxide, zirconium oxide, lanthanum oxide, and praseodymium oxide, and a second oxygen storage component, which comprised 24 wt % cerium oxide, zirconium oxide, lanthanum oxide, and yttrium oxide. Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly for coating a commercially available wall flow filter substrate, the coating being introduced into the porous filter wall over 100% of the substrate length. The total load of this filter amounted to 75 g/L; the total precious metal load amounted to 1.27 g/L, with a ratio of palladium to rhodium of 5:1. The coated filter thus obtained was dried and then calcined. It is hereafter referred to as VGPF1.

EXAMPLE 1

Coating the Input and Output Channels:

Aluminum oxide stabilized with lanthanum oxide was suspended in water together with an oxygen storage component, which comprised 24 wt % cerium oxide, zirconium oxide, lanthanum oxide, and yttrium oxide. The weight ratio of aluminum oxide and oxygen storage component was 56:44. The suspension thus obtained was then mixed with a palladium nitrate solution and a rhodium nitrate solution under constant stirring. The resulting coating suspension was used directly to coat a commercially available wall flow filter substrate. The coating suspension was coated onto the filter walls of the substrate, and in fact, first in the input channels, to a length of 60% of the filter length. The load of the inlet channel amounted to 62.5 g/L; the precious metal load amounted to 1.06 g/L, with a ratio of palladium to rhodium of 5:1. The coated filter thus obtained was dried and then calcined. Then, the output channels of the filter were coated to a length of 60% of the filter length with the same coating suspension. The coated filter thus obtained was dried again and then calcined. The total load of this filter thus amounted to 75 g/L; the total precious metal load amounted to 1.27 g/L, with a ratio of palladium to rhodium of 5:1. It is hereafter referred to as GPF1.

EXAMPLE 2

Aluminum oxide stabilized with lanthanum oxide was suspended in water together with a first oxygen storage component; which comprised 40 wt % cerium oxide, zirconium oxide, lanthanum oxide, and praseodymium oxide, and a second oxygen storage component, which comprised 24 wt % cerium oxide, zirconium oxide, lanthanum oxide, and yttrium oxide. Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly to coat a commercially available wall flow filter substrate. The coating suspension was coated onto the filter walls of the substrate, and in fact, first in the input channels, to a length of 60% of the filter length. The load of the inlet channel amounted to 62.5 g/L; the precious metal load amounted to 1.06 g/L, with a ratio of palladium to rhodium of 5:1. The coated filter thus obtained was dried and then calcined. Then, the output channels of the filter were coated to a length of 60% of the filter length with the same coating suspension. The coated filter thus obtained was dried again and then calcined. The total load of this filter thus amounted to 75 g/L; the total precious metal load amounted to 1.27 g/L, with a ratio of palladium to rhodium of 5:1. It is hereafter referred to as GPF2.

Catalytic Characterization

The particulate filters VGPF1, GPF1, and GPF2 were aged together in an engine test bench aging process. The latter consists of an overrun cut-off aging process with an exhaust gas temperature of 950° C. upstream of the catalyst inlet (maximum bed temperature of 1;030° C.). The aging time was 19 hours (see Motortechnische Zeitschrift, 1994, 55, 214-218).

The catalytically-active particulate filters were then tested in the aged state at an engine test bench in the so-called "light-off test" and in the "lambda sweep test." In the light-off test, the light-off behavior is determined for a stoichiometric exhaust gas composition with a constant average air ratio A ($\lambda$=0.999 with ±3.4% amplitude).

Table 1 below contains the temperatures $T_{50}$ at which in each case 50% of the considered components are converted.

TABLE 1

|  | $T_{50}$ HC stoichiometric | $T_{50}$ CO stoichiometric | $T_{50}$ NOx stoichiometric |
|---|---|---|---|
| VGPF1 | 376 | 384 | 398 |
| GPF1 | 340 | 342 | 340 |
| GPF2 | 376 | 384 | 390 |

The dynamic conversion behavior of the particulate filters was determined in a lambda sweep test in a range from $\lambda$=0.99-1.01 at a constant temperature of 510° C. The amplitude of $\lambda$ in this case was ±3.4%. Table 2 shows the conversion at the intersection of the CO and NOx conversion curves, along with the associated HC conversion of the aged particulate filters.

TABLE 2

|  | CO/NOx conversion at the point of intersection | HC conversion at $\lambda$ of the CO/NOx point of intersection |
|---|---|---|
| VGPF1 | 83% | 96% |
| GPF1 | 96% | 97% |
| GPF2 | 90% | 97% |

The particulate filters GPF1 and GPF2 according to the invention show a marked improvement in light-off behavior and dynamic CO/NOx conversion in the aged state compared with VGPF1.

COMPARATIVE EXAMPLE 2 a) Application of the In-Wall Coating:

Aluminum oxide stabilized with lanthanum oxide was suspended in water together with a first oxygen storage component, which comprised 40 wt % cerium oxide, zirconium oxide, lanthanum oxide, and praseodymium oxide, and a second oxygen storage component, which comprised 24 wt % cerium oxide, zirconium oxide, lanthanum oxide, and yttrium oxide, Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly for coating a commercially available wall flow filter substrate, the coating being introduced into the porous filter wall over 100% of the substrate length. The total load of this filter amounted to 100 g/L; the precious metal load amounted to 2.60 g/L, with a palladium to rhodium ratio of 60:13.75. The coated filter thus obtained was dried and then calcined.

b) Coating the Input Channels

Aluminum oxide stabilized with lanthanum oxide was suspended in water together with an oxygen storage component, which comprised 40 wt % cerium oxide, zirconium oxide, lanthanum oxide, and praseodymium oxide. The weight ratio of aluminum oxide and oxygen storage component was 50:50. The suspension thus obtained was then mixed with a palladium nitrate solution and a rhodium nitrate solution under constant stirring. The resulting coating suspension was used directly to coat the wall flow filter substrate obtained under a), wherein the filter walls of the substrate were coated, and in fact, in the input channels, to a length of 25% of the filter length. The load of the input channel amounted to 58 g/L; the precious metal load amounted to 2.30 g/L, with a ratio of palladium to rhodium of 10:3. The coated filter thus obtained was dried and then calcined.

c) Coating the Output Channels

Aluminum oxide stabilized with lanthanum oxide was suspended in water together with an oxygen storage component, which comprised 24 wt % cerium oxide, zirconium oxide, lanthanum oxide, and yttrium oxide. The weight ratio of aluminum oxide and oxygen storage component was 56:44. The suspension thus obtained was then mixed with a palladium nitrate solution and a rhodium nitrate solution under constant stirring. The resulting coating suspension was used directly to coat the wall flow filter substrate obtained under b), wherein the filter walls of the substrate were coated, and in fact, in the output channels, to a length of 25% of the filter length. The load of the outlet channel amounted to 59 g/L; the precious metal load amounted to 1.06 g/L, with a ratio of palladium to rhodium of 1:2. The coated filter thus obtained was dried and then calcined. The total load of this filter thus amounted to 130 g/L; the total precious metal load amounted to 3.44 g/L, with a ratio of palladium to rhodium of 10:3. It is hereafter referred to as VGPF2.

COMPARATIVE EXAMPLE 3 a) Application of the In-Wall Coating:

Aluminum oxide stabilized with lanthanum oxide was suspended in water together with a first oxygen storage component, which comprised 40 wt % cerium oxide, zirconium oxide, lanthanum oxide, and praseodymium oxide, and a second oxygen storage component, which comprised 24 wt % cerium oxide, zirconium oxide, lanthanum oxide, and yttrium oxide. Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly for coating a commercially available wall flow filter substrate, the coating being introduced into the porous filter wall over 100% of the substrate length. The load of this filter amounted to 100 g/L; the precious metal load amounted to 2.07 WI, with a ratio of palladium to rhodium of 45:13.5. The coated filter thus obtained was dried and then calcined.

b) Coating the Input Channels

Aluminum oxide stabilized with lanthanum oxide was suspended in water together with an oxygen storage component, which comprised 40 wt % cerium oxide, zirconium oxide, lanthanum oxide, and praseodymium oxide. The weight ratio of aluminum oxide and oxygen storage component was 50:50. The suspension thus obtained was then mixed with a palladium nitrate solution and a rhodium nitrate solution under constant stirring. The resulting coating suspension was used directly to coat the wall flow filter substrate obtained under a), wherein the filter walls of the substrate were coated, and in fact, in the input channels, to a length of 60% of the filter length. The load of the input channel amounted to 90 g/L; the precious metal load amounted to 2.30 g/L, with a ratio of palladium to rhodium of 10:3. The coated filter thus obtained was dried and then calcined. The total load of this filter thus amounted to 154 g/L; the total precious metal load amounted to 3.44 g/L, with a ratio of palladium to rhodium of 10:3. It is hereafter referred to as VGPF3.

EXAMPLE 3

Coating the Input Channels a) Aluminum oxide stabilized with lanthanum oxide was suspended in water together with an oxygen storage component, which comprised 24 wt % cerium oxide, zirconium oxide, lanthanum oxide, and yttrium oxide. The weight ratio of aluminum oxide and oxygen storage component was 56:44. The suspension thus obtained was then mixed with a palladium nitrate solution and a rhodium nitrate solution under constant stirring. The resulting coating suspension was used directly to coat a commercially available wall flow filter substrate. The coating suspension was coated onto the filter walls of the substrate, and in fact, in the input channels, to a length of 60% of the filter length. The load of the inlet channel amounted to 83.33 g/L; the precious metal load amounted to 2.87 g/L, with a ratio of palladium to rhodium of 10:3. The coated filter thus obtained was dried and then calcined. Then, the output channels of the filter were coated to a length of 60% of the filter length with the same coating suspension. The coated filter thus obtained was dried again and then calcined. The total load of this filter thus amounted to 100 g/L; the total precious metal load amounted to 3.44 g/L, with a ratio of palladium to rhodium of 10:3. It is hereafter referred to as GPF3.

Catalytic Characterization

The particulate filters VGPF2, VGF3, and GPF3 were aged together in an engine test bench aging process. The latter consists of an overrun cut-off aging process with an exhaust gas temperature of 950° C. upstream of the catalyst inlet (maximum bed temperature of 1,030° C.). The aging time was 76 hours (see Motortechnische Zeitschrift, 1994, 55, 214-218).

The catalytically-active particulate filters were then tested in the aged state at an engine test bench in the so-called "light-off test" and in the "lambda sweep test." In the light-off test, the light-off behavior is determined for a stoichiometric exhaust gas composition with a constant average air ratio λ (λ=0.999 with ±3.4% amplitude).

Table 3 below contains the temperatures $T_{50}$ at which in each case 50% of the considered components are converted.

TABLE 3

| | $T_{50}$ HC stoichiometric | $T_{50}$ CO stoichiometric | $T_{50}$ NOx stoichiometric |
|---|---|---|---|
| VGPF2 | 368 | 374 | 371 |
| VGPF3 | 387 | 395 | 396 |
| GPF3 | 323 | 325 | 319 |

The dynamic conversion behavior of the particulate filters was determined in a lambda sweep test in a range of λ=0.99-1.01 at a constant temperature of 510° C. The amplitude of λ in this case was ±3.4%. Table 4 shows the conversion at the intersection of the CO and NOx conversion curves, along with the associated HC conversion of the aged particulate filters.

TABLE 4

| | CO/NOx conversion at the point of intersection | HC conversion at λ of the CO/NOx point of intersection |
|---|---|---|
| VGPF2 | 92 | 97 |
| VGPF3 | 93 | 97 |
| GPF3 | 97 | 98 |

The particulate filter GPF3 according to the invention shows a marked improvement in light-off behavior and dynamic CO/NOx conversion in the aged state compared to VGPF2 and VGPF3.

COMPARATIVE EXAMPLE 4

Coating the Input Channels a) Aluminum oxide stabilized with lanthanum oxide was suspended in water together with an oxygen storage component, which comprised 24 wt % cerium oxide, zirconium oxide, lanthanum oxide, and yttrium oxide. The weight ratio of aluminum oxide and oxygen storage component was 56/44. The suspension thus obtained was then mixed with a palladium nitrate solution and a rhodium nitrate solution under constant stirring. The resulting coating suspension was used directly to coat a commercially available wall flow filter substrate. The coating suspension was coated onto the filter walls of the substrate, and in fact, in the input channels, to a length of 50% of the filter length. The load of the inlet channel amounted to 100 g/L; the precious metal load amounted to 1.42 g/L, with a ratio of palladium to rhodium of 5:1. The coated filter thus obtained was dried and then calcined.

Coating the Output Channels b) Aluminum oxide stabilized with lanthanum oxide was suspended in water together with a first oxygen storage component, which comprised 40 wt % cerium oxide, zirconium oxide, lanthanum oxide, and praseodymium oxide, and a second oxygen storage component, which comprised 24 wt % cerium oxide, zirconium oxide, lanthanum oxide, and yttrium oxide. Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly to coat the wall flow filter substrate obtained under a), wherein the filter walls of the substrate were coated, and in fact; in the output channels, to a length of 50% of the filter length. The load of the outlet channel amounted to 100 g/L; the precious metal load amounted to 1.42 g/L, with a ratio of palladium to rhodium of 5:1, The coated filter thus obtained was dried and then calcined. The total load of this filter thus amounted to 100 the total precious metal load amounted to 1.42 g/L, with a ratio of palladium to rhodium of 5:1. It is hereafter referred to as VGPF4.

EXAMPLE 4

Coating the Input Channels a) Aluminum oxide stabilized with lanthanum oxide was suspended in water together with an oxygen storage component, which comprised 24 wt % cerium oxide, zirconium oxide, lanthanum oxide, and yttrium oxide. The weight ratio of aluminum oxide and oxygen storage component was 56/44. The suspension thus obtained was then mixed with a palladium nitrate solution and a rhodium nitrate solution under constant stirring. The resulting coating suspension was used directly to coat a commercially available wall flow filter substrate. The coating suspension was coated onto the filter walls of the substrate, and in fact, in the input channels, to a length of 55% of the filter length. The load of the inlet channel amounted to 91 g/L; the precious metal load amounted to 1.16 g/L, with a ratio of palladium to rhodium of 5:1. The coated filter thus obtained was dried and then calcined.

Coating the Output Channels b) Aluminum oxide stabilized with lanthanum oxide was suspended in water together with a first oxygen storage component, which comprised 40 wt % cerium oxide, zirconium oxide, lanthanum oxide, and praseodymium oxide, and a second oxygen storage component, which comprised 24 wt % cerium oxide, zirconium oxide, lanthanum oxide, and yttrium oxide. Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly to coat the wall flow filter substrate obtained under a), wherein the filter walls of the substrate were coated, and in fact, in the output channels, to a length of 55% of the filter length. The load of the outlet channel amounted to 91 g/L; the precious metal load amounted to 1.16 g/L, with a ratio of palladium to rhodium of 5:1. The coated filter thus obtained was dried and then calcined. The total load of this filter thus amounted to 100 g/L; the total precious metal load amounted to 1.42 g/L, with a ratio of palladium to rhodium of 5:1, It is hereafter referred to as GPF3.

EXAMPLE 5

Coating the Input Channels a) Aluminum oxide stabilized with lanthanum oxide was suspended in water together with an oxygen storage component, which comprised 24 wt % cerium oxide, zirconium oxide, lanthanum oxide, and yttrium oxide. The weight ratio of aluminum oxide and oxygen storage component was 56/44. The suspension thus obtained was then mixed with a palladium nitrate solution and a rhodium nitrate solution under constant stirring. The resulting coating suspension was used directly to coat a commercially available wall flow filter substrate. The coating suspension was coated onto the filter walls of the substrate, and in fact, in the input channels, to a length of 60% of the filter length. The load of the inlet channel amounted to 83.33 g/L; the precious metal load amounted to 1.06 g/L, with a ratio of palladium to rhodium of 5:1. The coated filter thus obtained was dried and then calcined.

Coating the Output Channels b) Aluminum oxide stabilized with lanthanum oxide was suspended in water together with a first oxygen storage component, which comprised 40 wt % cerium oxide, zirconium oxide, lanthanum oxide, and praseodymium oxide, and a second oxygen storage component, which comprised 24 wt % cerium oxide, zirconium oxide, lanthanum oxide, and yttrium oxide. Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly to coat the wall flow filter substrate obtained under a), wherein the filter walls of the substrate were coated, and in fact, in the output channels, to a length of 60% of the filter length. The load of the outlet channel amounted to 83.33 g/L; the precious metal load amounted to 1.06 g/L, with a ratio of palladium to rhodium of 5:1. The coated filter thus obtained was dried and then calcined. The total load of this filter thus amounted to 100 g/L; the total precious metal load amounted to 1.42 g/L, with a ratio of palladium to rhodium of 5:1. It is hereafter referred to as GPF4.

EXAMPLE 6

Coating the Input Channels a) Aluminum oxide stabilized with lanthanum oxide was suspended in water together with an oxygen storage component, which comprised 24 wt % cerium oxide, zirconium oxide, lanthanum oxide, and yttrium oxide. The weight ratio of aluminum oxide and oxygen storage component was 56/44, The suspension thus obtained was then mixed with a palladium nitrate solution and a rhodium nitrate solution under constant stirring. The resulting coating suspension was used directly to coat a commercially available wall flow filter substrate. The coating suspension was coated onto the filter walls of the substrate, and in fact, in the input channels, to a length of 80% of the filter length. The load of the inlet channel amounted to 62.5 g/L; the precious metal load amounted to 0.79 g/L, with a ratio of palladium to rhodium of 5:1. The coated filter thus obtained was dried and then calcined.

Coating the Output Channels b) Aluminum oxide stabilized with lanthanum oxide was suspended in water together with a first oxygen storage component, which comprised 40 wt % cerium oxide, zirconium oxide, lanthanum oxide, and praseodymium oxide, and a second oxygen storage component, which comprised 24 wt % cerium oxide, zirconium oxide, lanthanum oxide, and yttrium oxide. Both oxygen storage components were used in equal parts. The weight ratio of aluminum oxide and oxygen storage component was 30:70. The suspension thus obtained was then mixed with a palladium nitrate solution and a rhodium nitrate solution under constant stirring. The resulting coating suspension was used directly to coat the wall flow filter substrate obtained under a), wherein the filter walls of the substrate were coated, and in fact, in the output channels, to a length of 80% of the filter length. The load of the outlet channel amounted to 62.5 g/L; the precious metal load amounted to 0.79 with a ratio of palladium to rhodium of 5:1. The coated filter thus obtained was dried and then calcined. The total load of this filter thus amounted to 100 g/L; the total precious metal load amounted to 1.42 g/L, with a ratio of palladium to rhodium of 5:1. It is hereafter referred to as GPF5.

Catalytic Characterization

The particulate filters VGPF4, GPF4, GPF5, and GPF6 were compared at a cold blow test bench with respect to the exhaust gas back pressure.

Table 5 below shows pressure loss data which were determined at an air temperature of 21° C. and a volume flow rate of 600 m3/h. The values were normalized to VGPF4 for better clarity.

TABLE 5

|  | VGPF4 | GPF4 | GPF5 | GPF6 |
|---|---|---|---|---|
| Δp normalized to VGPF4 | 100 | 92 | 78 | 70 |

The filters GPF4, GPF5, and GPF6 according to the invention all surprisingly have a lower pressure loss than the comparative example VGPF4, even though they cover a larger surface of the filter walls. This is quite surprising, since it could actually be assumed that longer coatings cause a higher exhaust gas back pressure, since, here, more exhaust gas must flow through the catalytic coatings, since, as a result, less exhaust gas can flow through the filter wall that is not provided with a coating.

It was, furthermore, systematically investigated what the main effects responsible for the lowest possible exhaust gas back pressure are. Here, various filters with different zone lengths (factor A) and washcoat layer thicknesses (factor B) were prepared and compared with one another. All filters had the same total washcoat load and the same precious metal content,

TABLE 6

| Factor | Name | Unit | Min | Max |
|---|---|---|---|---|
| A | Zone length | % | 30 | 60 |
| B | Washcoat thickness | g/L | 50 | 80 |

Figure 2:
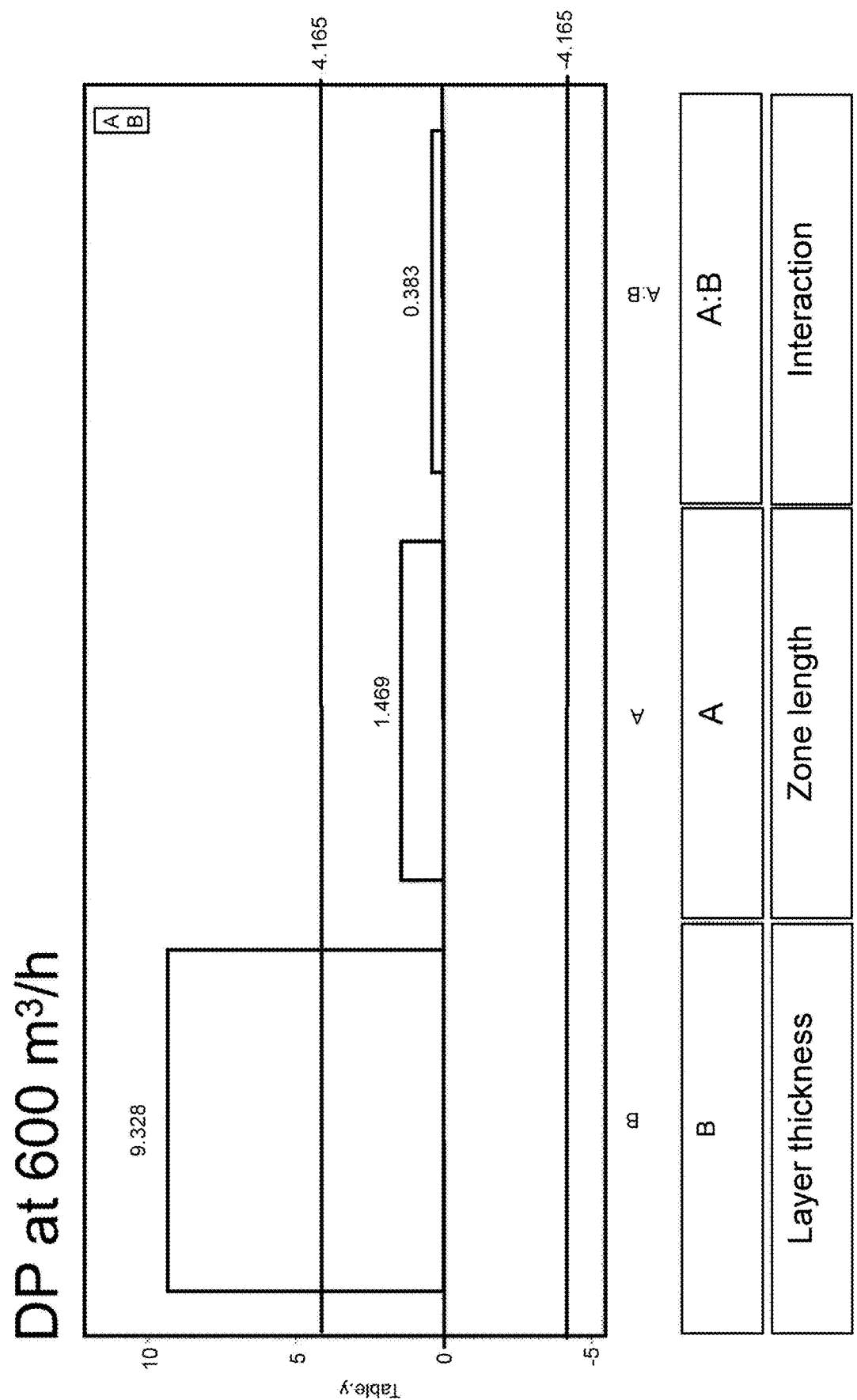
FIG. 2 shows results of an exhaust back pressure analysis.

The statistical evaluation shows that it is particularly advantageous to distribute the washcoat on as large a surface as possible on the filter walls with a resultant low layer thickness, instead of covering only a small surface with a high layer thickness, since a high layer thickness is to be regarded as the main cause of a high exhaust gas back pressure (FIG. 2). In addition, the particulate filters were aged together in an engine test bench aging process. This aging process consists of an overrun cut-off aging process with an exhaust gas temperature of 950° C. before the catalyst inlet (maximum bed temperature of 1,030° C.). The aging time was 19 hours (see Motortechnische Zeitschrift, 1994, 55, 214-218).

Figure 3:
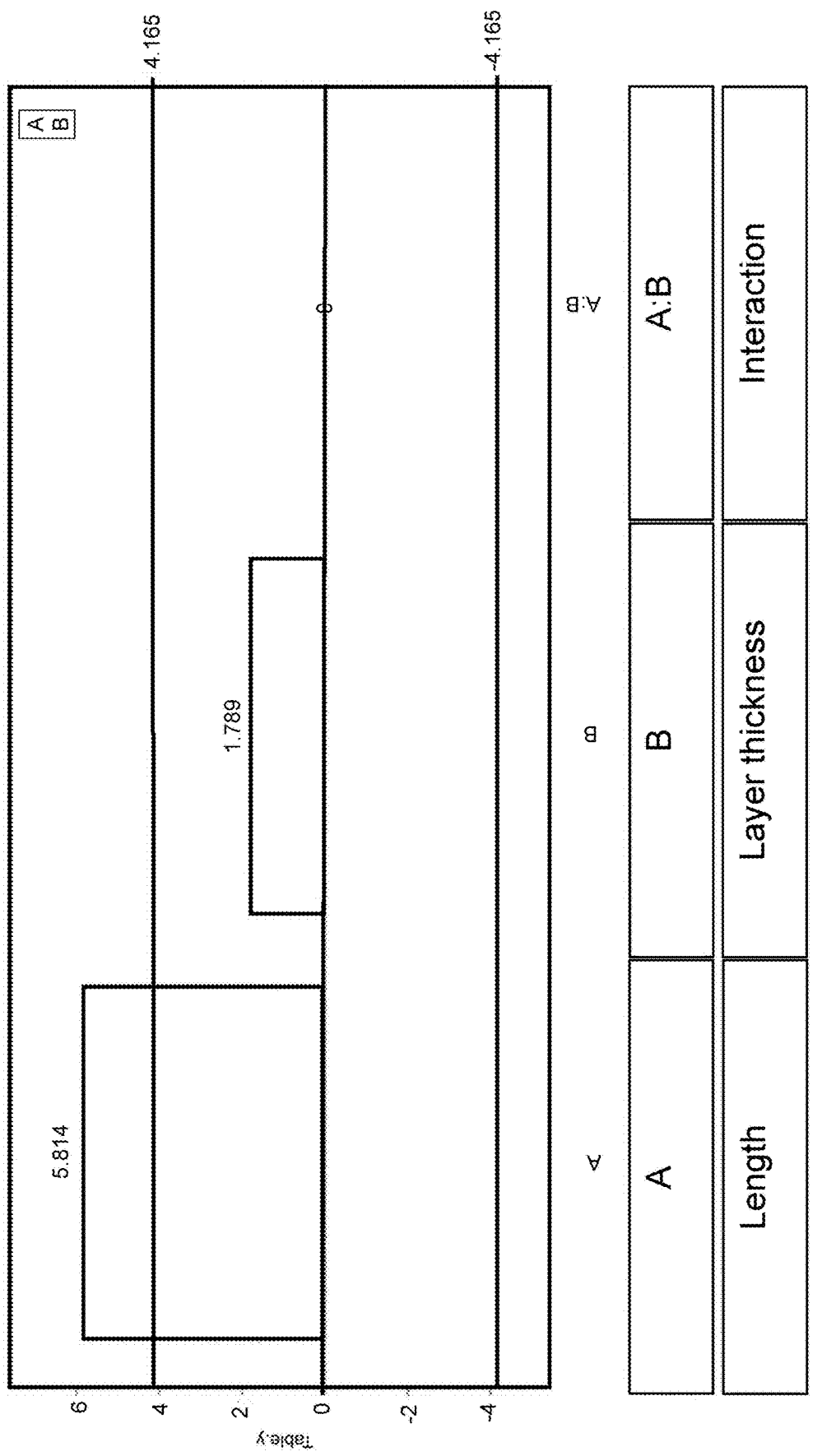
FIG. 3 shows results of a lambda sweep test.

The catalytically-active particulate filters were then tested in the aged state at an engine test bench in the so-called "lambda sweep test." Surprisingly, the statistical evaluation of the test results also shows a significant advantage in the lambda sweep test if the catalytic coating is applied with a low layer thickness to as large a surface as possible (FIG. 3).

In addition, it was investigated to what extent an embodiment consisting of one short and one long zone differs from an embodiment consisting of two long zones. For this purpose, a filter according to the invention with zone lengths of 60% of the filter length in each case was compared with a comparison filter with zone lengths of 90% in the inlet channel and 30% in the outlet channel. In the light-off test, in which the light-off behavior for a stoichiometric exhaust gas composition with a constant average air ratio A is determined ($\lambda$=0.999 with ±3.4% amplitude), it is found that the filter according to the invention with zones lengths of 60% in each case can convert the corresponding exhaust gas components at lower temperatures than the filter not according to the invention with zone lengths of 90% and 30%. Table 7 below contains the temperatures $T_{50}$ at which in each case 50% of the considered components are converted.

TABLE 7

| Zone length | $T_{50}$ HC stoichiometric | $T_{50}$ CO stoichiometric | $T_{50}$ NOx stoichiometric |
|---|---|---|---|
| 90:30 | 288 | 287 | 288 |
| 60:60 | 284 | 284 | 284 |

The invention claimed is:

1. Particulate filter, comprising a wall flow filter of length L and two coatings Y and Z, wherein the wall flow filter comprises channels E and A that extend in parallel between a first and a second end of the wall flow filter and are separated by porous walls which form surfaces $O_E$ or $O_A$, and wherein the channels E are closed at the second end and the channels A are closed at the first end,
characterized in that
coating Y is located in the channels E on the surfaces $O_E$ and extends from the first end of the wall flow filter over 55 to 90% of the length L,
coating Z is located in the channels A on the surfaces $O_A$ and extends from the second end of the wall flow filter over 55 to 90% of the length L,
and the coatings Y and Z each contain one or more carrier materials for precious metal in a quantity of 20 to 70 wt %, relative to the total weight of the coating Y or Z, and the coatings Y and Z each contain rhodium, palladium, or palladium and rhodium as a precious metal or metals, and the coatings Y and Z each contain one or more oxygen storage components in a quantity of 30 to 80 wt %, relative to the total weight of the coating Y or Z, and wherein the coating Y has the same said one or more oxygen storage components as that of coating Z, and the coating Y has the same said one or more carrier materials for precious metal as that of coating Z, and wherein the coatings Y and Z both comprise lanthanum-stabilized aluminum oxide, as a portion or an entirety of said one or more carrier materials for precious metal, and wherein the coatings Y and Z both comprise, as one of said one or more oxygen storage components, an oxygen storage component comprising zirconium oxide, cerium oxide, yttrium oxide, and lanthanum oxide.

2. Particulate filter according to claim 1, characterized in that the coating Y extends from the first end of the wall flow filter to 57 to 80% of length L of the wall flow filter.

3. Particulate filter according to claim 1, characterized in that the coating Z extends from the second end of the wall flow filter to 57 to 80% of length L of the wall flow filter.

4. Particulate filter according to claim 1, characterized in that each of the coatings Y and Z have said precious metal or metals affixed to a plurality of said one or more carrier materials, and each of the coatings Y and Z contains a plurality of said one or more oxygen storage components.

5. Particulate filter according to claim 1, characterized in that each of coatings Y and Z include a plurality of said one or more carrier materials for said precious metal or metals, wherein, in addition to the lanthanum-stabilized aluminum oxide, there is one or more further carrier materials that are selected from the series consisting of non-doped aluminum oxide, zirconium oxide and/or titanium doped aluminum oxide, silicon oxide, titanium dioxide, and mixed oxides of one or more of these.

6. Particulate filter according to claim 4, characterized in that the carrier materials for the precious metals are metal oxides with a BET surface area of 30 to 250 m²/g (determined according to DIN 66132).

7. Method for removing particles, carbon monoxide, hydrocarbons, and nitrogen oxides from the exhaust gas of combustion engines operated with a stoichiometric air/fuel mixture, characterized in that the exhaust gas is passed over a particulate filter according to claim 1.

8. Particulate filter according to claim 2, characterized in that the coating Z extends from the second end of the wall flow filter to 57 to 80% of length L of the wall flow filter.

9. Particulate filter according to claim 2, characterized in that each of the coatings Y and Z have said precious metal or metals affixed to a plurality of said one or more carrier materials, and each of the coatings Y and Z contains a plurality of said one or more oxygen storage components.

10. Particulate filter according to claim 3, characterized in that each of the coatings Y and Z have said precious metal or metals affixed to a plurality of said one or more carrier materials, and each of the coatings Y and Z contains a plurality of said one or more oxygen storage components.

11. Particulate filter according to claim 1, characterized in that the coating Y has the same precious metal or metals as the coating Z.

12. Particulate filter according to claim 1, characterized in that the coatings Y and Z each contain one or more carrier materials for precious metal in a quantity of 30 to 60 wt %, relative to the total weight of the coating Y or Z, and the coatings Y and Z each contain one or more oxygen storage components in a quantity of 40 to 70 wt %, relative to the total weight of the coating Y or Z.

13. Particulate filter according to claim 12, characterized in that said one or more carrier materials for precious metal includes aluminum oxide, in doped form, or both doped and non-doped form, in said amount of 30 to 60 wt %.

14. Particulate filter according to claim 12, characterized in that the 30 to 60 wt % is represented by doped aluminum oxide in the form of lanthanum-stabilized aluminum oxide.

15. Particulate filter according to claim 1, characterized in that said one or more carrier materials for precious metal includes aluminum oxide, in doped form, or both doped and non-doped form, in said amount of 20 to 70 wt %.

16. Particulate filter according to claim 15, characterized in that the 20 to 70 wt % is represented by doped aluminum oxide in the form of lanthanum-stabilized aluminum oxide.

* * * * *